C. R. BENEFIELD.
CULTIVATOR.
APPLICATION FILED MAY 22, 1912.
1,076,476.
Patented Oct. 21, 1913.
3 SHEETS—SHEET 1.
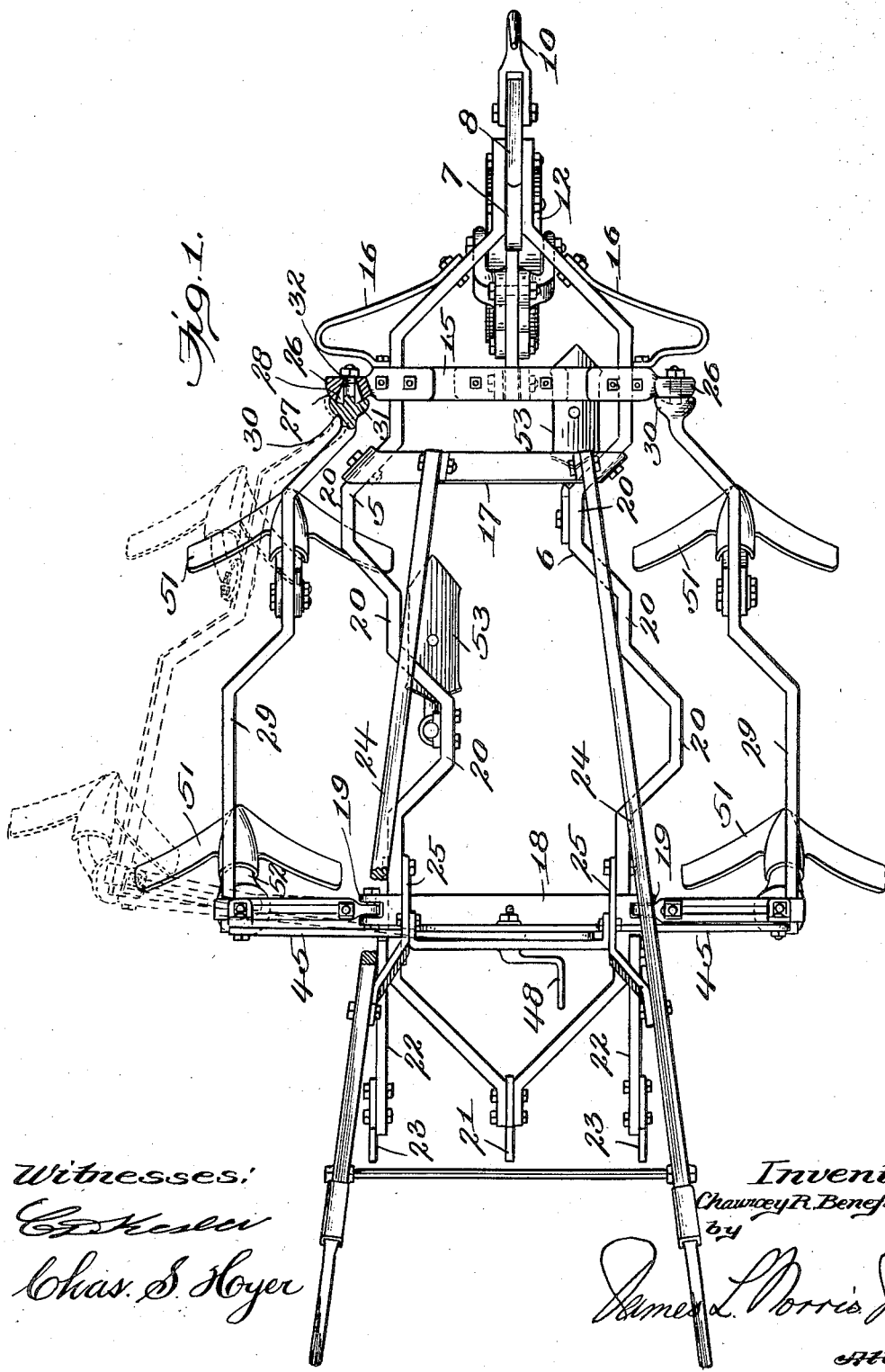
Witnesses:
Inventor
Chauncey R. Benefield
by
James L. Norris Jr.
Atty.

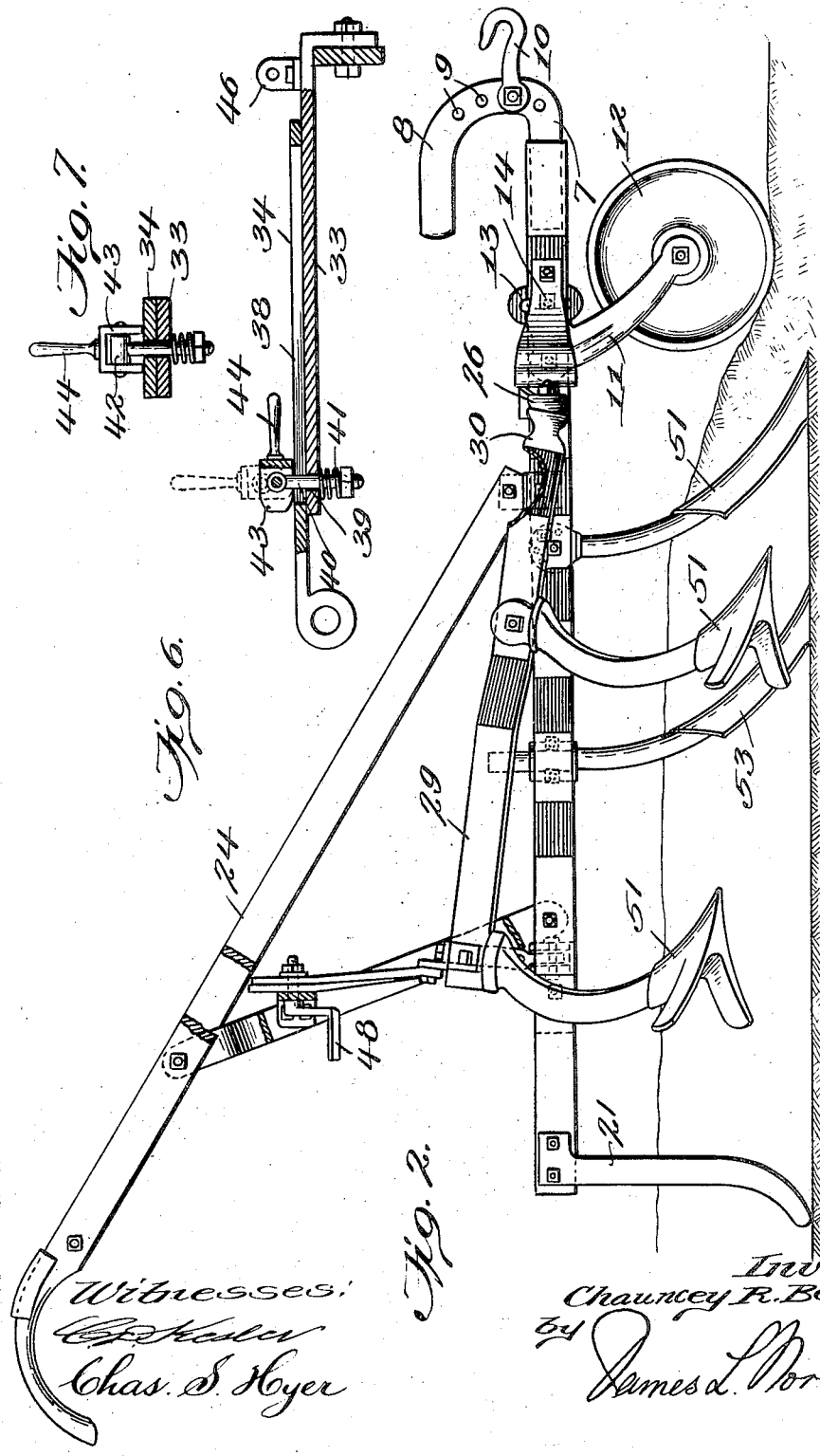

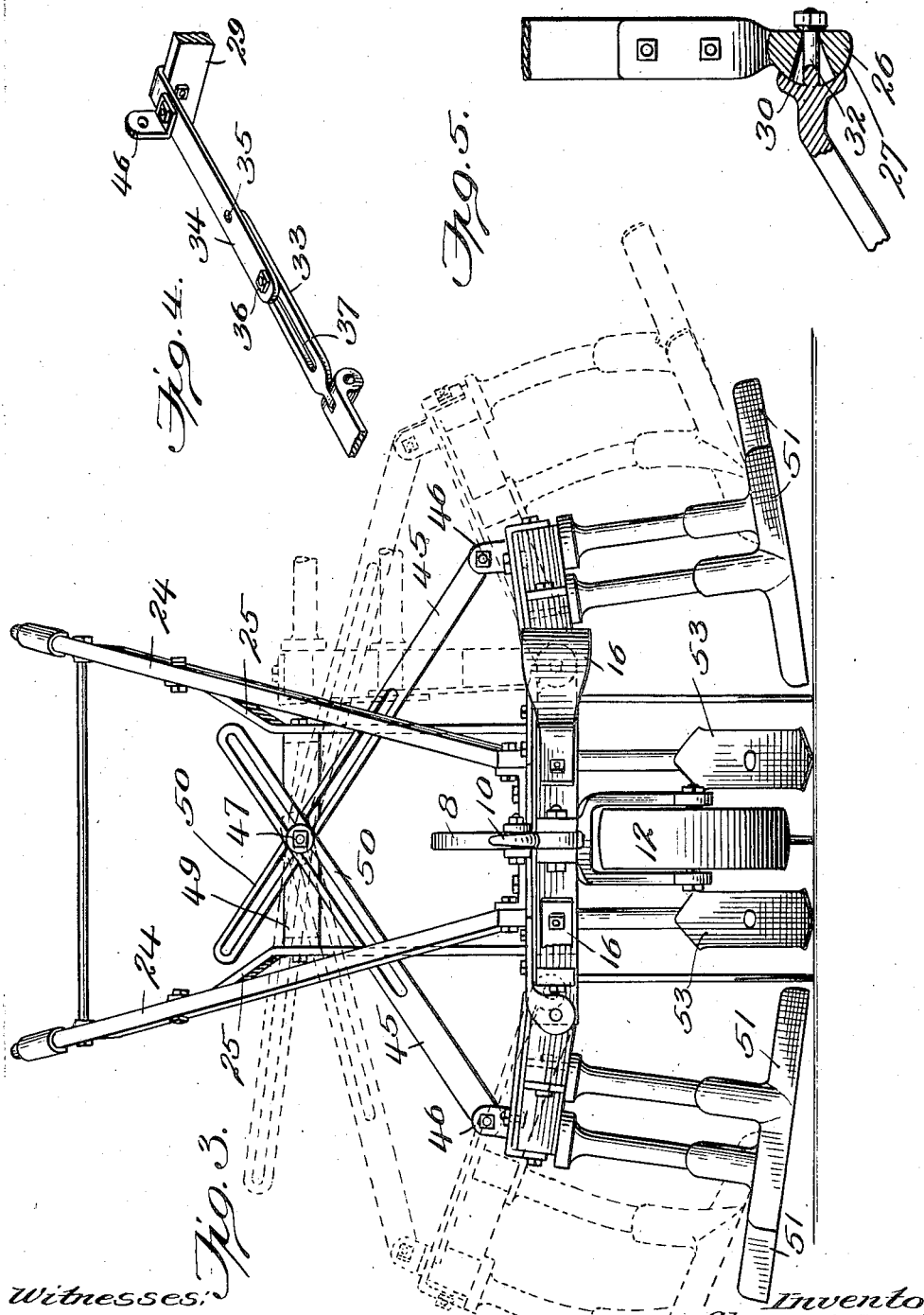

UNITED STATES PATENT OFFICE.

CHAUNCEY R. BENEFIELD, OF MEMPHIS, TENNESSEE.

CULTIVATOR.

1,076,476.

Specification of Letters Patent.

Patented Oct. 21, 1913.

Application filed May 22, 1912. Serial No. 698,974.

*To all whom it may concern:*

Be it known that I, CHAUNCEY R. BENEFIELD, a citizen of the United States, residing at Memphis, in the county of Shelby and State of Tennessee, have invented new and useful Improvements in Cultivators, of which the following is a specification.

This invention relates to cultivators embodying adjustable wings or side beams that may be moved upwardly or downwardly and inwardly and outwardly to accommodate any condition of land, whereby the central portion of the cultivator may be utilized in cultivating the soil at regular depths while the movable side beams or wings may be adjusted to cultivate ridges to the proper depth or depressed and adapted to hug the middle portion of the soil relatively to the cultivator as in listed land. Furthermore the side beams or wings may be utilized to carry different devices for cultivating the plants in furrows and at the same time avoid tearing down the middle bead or ridge to any material extent. The improved cultivator is also adapted for side hill uses or for level land having an irregular rise at one side thereof, whereby either side beam or wing may be elevated to the proper extent or thrown completely out of commission while the middle portion and remaining side wing of the cultivator are in operation.

The main advantage of the improved cultivator is that it materially reduces the number of draft animals necessary to effectively cultivate the land therewith, it being found that the cultivating operation by the use of the improved cultivator may be carried on with one draft animal.

A further advantage is that the improved cultivator may be readily converted into a side harrow by reversing the blades and causing the soil to be taken away from the plants cultivated or thrown up into hills relatively to the plants. The parts of the cultivator may also be adjusted to enable it to be conveniently conveyed from and onto a piece of land.

The invention consists in the construction and arrangement of the several parts which will be more fully hereinafter described and claimed.

In the drawings: Figure 1 is a top plan view of a cultivator embodying the features of the invention and showing one of the side beams or wings adjusted in dotted lines. Fig. 2 is a sectional side elevation of the cultivator. Fig. 3 is a front end elevation showing the parts of the cultivator adjusted in different positions in dotted lines. Figs. 4 and 5 are detail views showing different parts of the cultivator. Fig. 6 is a longitudinal vertical section of one of the side beam or wing adjustable couplings and illustrating a slight modification. Fig. 7 is a transverse vertical section through the structure shown by Fig. 6.

The main frame of the improved cultivator comprises two beams 5 and 6 which are converged at their front extremities and connected to a draft bar 7 having its front extremity 8 curved upwardly and then projected rearwardly, as shown by Fig. 2, and provided with a series of apertures 9 for the adjustable attachment of a clevis or analogous device 10 for the purpose of regulating the draft relatively to the depth of penetration of the cultivating devices. Adjustably depending from the draft bar 7 is a forwardly and downwardly inclined shank or post 11 which is suitably bifurcated to rotatably receive a colter wheel 12, the upper extremity of the shank or post 11 being at an angle to the latter and in the form of a slotted head 13 to receive an adjusting bolt 14. At its rear end, the said draft bar is attached to a transverse coupling bar 15 which is projected at opposite extremities outwardly beyond the main beams 5 and 6, to which beams it is also secured. Between the outer projecting portions or opposite extremities of the transverse coupling bar 15 and the converging parts of the beams 5 and 6 in advance thereof, braces 16 are applied for the purpose of strengthening the front of the machine and also of maintaining the said coupling bar 15 in fixed position to resist loosening movement or displacement. The main beams 5 and 6 in rear of the coupling bar 15 have a cross-connecting strip 17 secured thereto, and to the said main beams near the rear extremities of the latter a cross frame bar 18 is applied and secured and has its opposite ends projected outwardly beyond the said beams and formed with pairs of eyes or apertured lugs 19 for a purpose which will be presently explained. The beams 5 and 6 are irregularly formed, that is, each beam has a plurality of offsets or indentations 20 which permit the cultivating devices to be attached thereto in various positions inwardly and outwardly relative to the longitudinal center of the machine to compensate for different widths of rows or cultivating requirements, and which also permit the forward and rear cultivating devices to be disposed out of alinement with respect to each other, so as to cover a greater surface of the land, transversely considered, in the cultivating operation. In rear of the frame bar 18 the beams 5 and 6 are converged and receive between them the upper extremity of the shank or post of a runner 21; and to the outer sides of the said beams 5 and 6 immediately in rear of the frame bar 18 extension bars 22 are attached. These bars 22 project rearwardly an equal distance with the rear converged extremity of the main frame or the connected beams 5 and 6 and also carry runners 23.

Instead of the runner 21 held between the rear converged extremities of the beams 5 and 6, a shovel plow may be attached or other cultivating devices, such as coverers or harrow teeth, and any other suitable implement may also be substituted for the runners 23.

The runners regulate the depth of penetration of the rear portion of the cultivator and also coöperate with the colter wheel 12 to cause the cultivator to move in regular alinement relatively to the rows of plants cultivated or the furrows that may be formed. Handle bars 24 are secured at their front ends to the connecting strap 17 and extend upwardly and rearwardly over the cultivator and are attached by braces 25 to the beams 5 and 6 immediately in advance of the frame bar 18, the handle bars being arranged at the rear of the cultivator in the ordinary manner so that the operator may readily manipulate the machine.

On the opposite ends of the coupling bar 15 heads 26 are applied or secured, each head embodying a rear convex or semispherical face 27 and a central rearwardly diverging opening 28 extending fully therethrough. On each side of the cultivator is a wing or side beam 29 having a socket 30 at its front extremity provided with a concave seat 31 to receive the convex face 27 of the head 26, the socket having a bolt or pin 32 extending centrally therefrom through the opening 28 of the head and secured by a nut as shown. The socket 30 and head 26 thus form a ball and socket connection to render the adjustment of the side beam or wing 29 sensitive and without material wear or resistance so far as the forward extremity thereof is concerned. The rear end of each wing 29 has the outer extremity of a coupling device secured thereto, and this device may be either of the form shown by Fig. 4 or that shown by Figs. 6 and 7. The said coupling device is preferably composed of two bars 33 and 34 arranged in telescopic association or with the bar 34 movable over the bar 33, the bar 33, as shown by Fig. 4, being pivotally attached at its inner end between the ears or lugs 19 of the frame bar 18, and the bar 34 secured at its outer end to the rear end of the side beam or wing 29. In the form of the coupling device shown by Figs. 6 and 7, the bar 34 has its inner end pivotally attached to the outer end of the frame bar 18 and the bar 33 is secured to the side beam or wing 29. In the form of the coupling device as shown by Fig. 4, the bar 34 has a plurality of openings 35 therein to receive a clamping bolt and nut 36 which is slidable in a longitudinal slot 37 in the under bar 33 and by means of which the two bars may be contracted or extended relatively to each other and correspondingly shift and position each side beam or wing 29 inwardly or outwardly relatively to the longitudinal center of the machine or the adjacent beams 5 and 6 and thereby decrease or increase the transverse cultivating extent of the machine as a whole.

For many reasons the securing means for the bars 33 and 34 of the coupling device as shown by Figs. 6 and 7 is preferred, and consists in longitudinally slotting the bar 34, as at 38, and forming an opening 39 in the lower bar 33 to receive a bolt or pin 40 having a lower nutted end with a spring 41 thereon and bearing against the under side of the bar 33. The upper end of the pin or bolt 40 is provided with a cross-head 42 pivotally held between the opposite ends of a bifurcated cam 43 having a handle 44, the head 42 being eccentrically pivoted with relation to the members of the cam 43. When the cam 43 is turned down in the position shown by Fig. 6 the pin 40 is loose and the bars 33 and 34 may be shifted relatively to each other, and when the cam is elevated as shown by Fig. 7 the bars 33 and 34 are caused to have a binding association by reason of the cam 43 forcefully pressing on the upper bar 34. The side beams or wings 29 may also be elevated or depressed through the medium of adjusting bars 45 attached to outer angle lugs 46 secured either on the bars 34 of the coupling device, as shown by Fig. 4, or on the bars 33 of the coupling device, as shown by Figs. 6 and 7, the said adjusting bars 45 being crossed in rear of the handle bars 24 and held in adjusted position by a clamping bolt or analogous device 47 having a rearwardly projecting crank handle 48 and held in a supporting bar 49 secured to the upper portions of the braces 25. The clamping bolt or analogous device 47 projects through slots 50 extending longitudinally of the inner extremities of the said adjusting bars 45, as clearly shown by Fig. 3, the said slots 50 being long enough to give the side beams or wings 29 a wide range of adjustment either above or below a horizontal plane or to entirely lift either one or both side beams or wings above the plane of the beams 5 and 6. The side beams or wings 29 have cultivating devices attached thereto at intervals, those shown being in the form of sweeps 51 with their posts or shanks 52 removably attached to the said side beams or wings. It will be understood, however, that scrapers, side plows, bull tongues or harrow teeth may be substituted for the sweeps 51, and it is proposed to equip the machine with all forms of cultivating devices that may be adapted to be used thereon. The main beams 5 and 6 are also shown provided with shovel plows or cultivators 53, and these may be replaced by any other cultivating devices desired and as the particular work to be done may require.

By connecting the forward ends of the side beams or wings 29 through the medium of the ball and socket devices or joints hereinbefore described, they may be adjusted inwardly or outwardly as well as vertically without the least binding action at the said forward joints, and the change of position of the beams will not be in the least retarded, and after the desired adjustment of the side beams has been made they may be retained positively in the positions desired.

The improved cultivator as hereinbefore described will be found exceptionally useful in general cultivation and adaptable to various conditions as to irregularities in the land cultivated as well as side hill uses and is not in the least restricted as to the character of the cultivating devices that may be used thereon.

What is claimed is:

1. In a cultivator of the class specified, the combination of a main frame comprising a pair of beams, a coupling bar extending across the forward extremities of the said pair of beams, side beams or wings connected at their front extremities to the coupling bar by ball and socket joints, extensible coupling devices attached to the rear ends of the side beams or wings and the rear portion of the cultivator, handle bars connected to the pair of beams of the main frame, and adjustable draw bars also connected to the rear extremities of the side beams or wings and a portion of the handle bars.

2. In a cultivator of the class specified, the combination of a main frame comprising a pair of beams, a coupling bar extending across the forward extremities of the said main frame beams, side beams or wings attached at their front ends by universal joints to the opposite ends of the coupling bar, a frame beam extending across and secured to the rear portions of the said main frame beams, adjustable coupling bars connected to the opposite ends of the said main frame bars and the rear end of the side beams or wings, a pair of handle bars connected to the pair of beams of the main frame and having a supporting bar attached thereto, slotted draw bars movably attached to the rear ends of the side beams or wings, means for adjustably holding the said draw bars on the supporting bar of the handle, cultivating devices attached to all of the beams, and draft means secured to the front extremities of the pair of beams of the main frame.

In testimony whereof I have hereunto set my hand in presence of two subscribing witnesses.

CHAUNCEY R. BENEFIELD.

Witnesses:
D. O. WHEELER,
B. F. WOLF.